United States Patent
Grass et al.

(10) Patent No.: US 11,932,749 B2
(45) Date of Patent: Mar. 19, 2024

(54) PLASTICIZER COMPOSITION COMPRISING TRIPENTYL ESTERS OF 1,2,4-CYCLOHEXANETRICARBOXYLIC ACID

(71) Applicant: Evonik Oxeno GmBH & Co. KG, Marl (DE)

(72) Inventors: Michael Grass, Haltern am See (DE); Florian Boeck, Witten (DE); Benjamin Woldt, Suedlohn (DE)

(73) Assignee: Evonik Oxeno GmBH & Co. KG, Marl (DE)

( * ) Notice: Subject to any disclaimer, the term of this patent is extended or adjusted under 35 U.S.C. 154(b) by 0 days.

(21) Appl. No.: 17/806,915

(22) Filed: Jun. 14, 2022

(65) Prior Publication Data

US 2022/0411604 A1 Dec. 29, 2022

(30) Foreign Application Priority Data

Jun. 15, 2021 (EP) .................................. 21179453

(51) Int. Cl.
*C08K 5/12* (2006.01)
*C08K 5/00* (2006.01)

(52) U.S. Cl.
CPC ............. *C08K 5/12* (2013.01); *C08K 5/0016* (2013.01)

(58) Field of Classification Search
CPC .. C08K 5/12; C08K 5/0016; C08K 2201/014; C08L 27/06; C07C 69/76
See application file for complete search history.

(56) References Cited

U.S. PATENT DOCUMENTS

| | | |
|---|---|---|
| 10,577,479 B2 | 3/2020 | Woldt et al. |
| 10,875,981 B2 | 12/2020 | Woldt et al. |
| 2017/0088691 A1 | 3/2017 | Woldt et al. |
| 2018/0319954 A1 | 11/2018 | Woldt et al. |
| 2021/0221976 A1 | 7/2021 | Kim et al. |
| 2022/0162436 A1 | 5/2022 | Kim et al. |

FOREIGN PATENT DOCUMENTS

| | | |
|---|---|---|
| EP | 3708610 | 9/2020 |
| EP | 3875526 | 9/2021 |
| WO | 2020/091361 | 5/2020 |
| WO | 2020/222494 | 11/2020 |

OTHER PUBLICATIONS

Database CA [online], Chemical Abstracts Service Columbus, Ohio, US, Kim Hyun Kyu et al: "Plasticizer composition and resin composition comprising same", XP002804616, Database accession No. 2020:2247176, Nov. 6, 2020, 3 pages.
European Search Report dated Nov. 12, 2021, in European Application No. 21179453.2, 6 pages.
U.S. Pat. No. 10,577,479, Mar. 3, 2020, 2017/0088691, Woldt et al.
U.S. Pat. No. 10,875,981, Dec. 29, 2020, 2018/0319954, Woldt et al.

*Primary Examiner* — Ling Siu Choi
*Assistant Examiner* — Olga Lucia Donahue
(74) *Attorney, Agent, or Firm* — Grüneberg and Myers PLLC

(57) ABSTRACT

A plasticizer composition contains a compound according to the following formula (I)

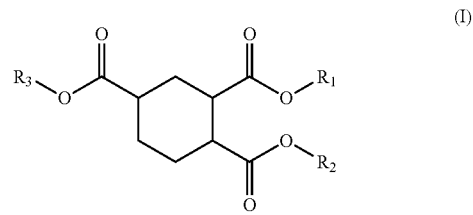

wherein the radicals $R_1$, $R_2$ and $R_3$ are each independently selected from n-pentyl, 2-methylbutyl and 3-methylbutyl. The plasticizer composition can be used as plasticizer for polymers and a corresponding plastic composition contains the plasticizer composition.

17 Claims, No Drawings

PLASTICIZER COMPOSITION COMPRISING TRIPENTYL ESTERS OF 1,2,4-CYCLOHEXANETRICARBOXYLIC ACID

CROSS-REFERENCE TO RELATED APPLICATIONS

This application claims priority to European Application No. 21179453.2, filed on Jun. 15, 2021, the content of which is hereby incorporated by reference in its entirety.

BACKGROUND OF THE INVENTION

Field of the Invention

The present invention relates to a plasticizer composition comprising a compound according to the following formula (I),

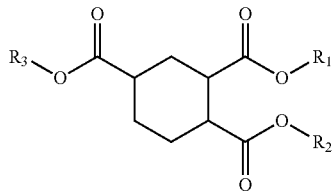

wherein the radicals $R_1$, $R_2$ and $R_3$ are each independently selected from the group consisting of n-pentyl, 2-methylbutyl and 3-methylbutyl. The present invention further relates to the use of the plasticizer composition as plasticizer for polymers and a plastic composition comprising the plasticizer composition.

Description of Related Art

Plastics and polymers are indispensable for most applications. Polyvinyl chloride (PVC) is one of the most economically significant plastics and is used both in the form of hard PVC and in the form of soft PVC. Since many plastics and polymers are in many cases too brittle or difficult to process, plasticizers or plasticizer compositions are added to the plastics in many fields of application in order to adjust their properties accordingly.

In the production of PVC-based products, for example floor coverings, toys and the like, processability is improved and further use-relevant properties are adjusted by adding plasticizers to the PVC. Because of their advantageous properties, some of the most important plasticizers for PVC and vinyl chloride-containing copolymers are still compounds from the group of the phthalates, especially diethylhexyl phthalate (DEHP), diisononyl phthalate (DINP) and diisodecyl phthalate (DIDP). Because of discussions about possible toxic effects of this substance class, alternatives to phthalate-based plasticizers have been sought for many years.

Numerous possible alternatives have already been described in the prior art, for example 1,2- or 1,4-cyclohexanedicarboxylic esters, which may be prepared via ring hydrogenation of phthalates or terephthalates. Other plasticizers are also known and are described in the relevant literature.

SUMMARY OF THE INVENTION

The object of the present invention was the provision of plasticizers which may be used as substitutes for phthalate-based plasticizers. These plasticizers were to have processability with polymers, especially with PVC and vinyl chloride-containing copolymers, at least at the level of DINP and preferably even better. In particular, these novel plasticizers were to have a low tendency to migrate out of plasticized PVC or plasticized vinyl chloride-containing copolymers into other materials.

The underlying object was achieved by the plasticizers described below. Preferred embodiments are also specified in the description.

The Invention also includes the following embodiments:
1. Plasticizer composition comprising at least one compound according to the following formula (I)

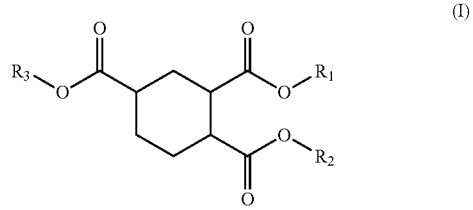

wherein the radicals $R_1$, $R_2$ and $R_3$ are each independently selected from the group consisting of n-pentyl, 2-methylbutyl and 3-methylbutyl.
2. Plasticizer composition according to embodiment 1, wherein the radicals $R_1$, $R_2$ and $R_3$ are identical.
3. Plasticizer composition according to embodiment 1, comprising a mixture of compounds according to the formula (I)

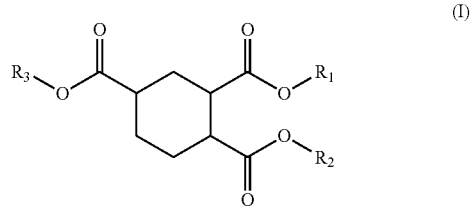

wherein present in the mixture are one radical from the group consisting of n-pentyl, 2-methylbutyl and 3-methylbutyl at a proportion of 30 to 95 mol % and one other radical or the two other radicals from the group specified at a proportion of 5 to 70 mol %, based in each case on all radicals $R_1$, $R_2$ and $R_3$ of the compound according to the formula (I).
4. Plasticizer composition according to embodiment 3, wherein present in the mixture are one radical from the group consisting of n-pentyl, 2-methylbutyl and 3-methylbutyl at a proportion of 40 to 95 mol % and one other radical or the two other radicals from the group specified at a proportion of 5 to 60 mol %, based in each case on all radicals $R_1$, $R_2$ and $R_3$ of the compound according to the formula (I).
5. Plasticizer composition according to embodiment 3 or 4, wherein the 2-methylbutyl radical is present in the mixture at a proportion of at maximum 60 mol %, preferably at a proportion of at maximum 40 mol %, based in each case on all radicals $R_1$, $R_2$ and $R_3$ of the compound according to the formula (I).

6. Plasticizer composition according to any of embodiments 1 to 5, wherein the plasticizer composition comprises a further plasticizer selected from the group consisting or alkyl benzoates, dialkyl adipates, glycerol esters, trialkyl citrates, acylated trialkyl citrates, glycol dibenzoates, trialkyl esters of trimellitic acid, dialkyl terephthalates, dialkyl phthalates, esters of furandicarboxylic acid, dialkanoyl esters of dianhydrohexitols (e.g. isosorbide), epoxidized fatty acid alkyl esters, polymer plasticizers, for example the polyadipates, and dialkyl esters of 1,2-, 1,3- or 1,4-cyclohexanedicarboxylic acid.

7. Plasticizer composition according to embodiment 6, wherein the further plasticizer is selected from the group consisting of C8- to C13-alkyl benzoates, C4- to C10-dialkyl adipates, trialkyl citrates having C4 to C9-alky groups, C4- to C10-trialkyl trimellitates, C4- to C9-dialkyl terephthalates, C4- to C13-dialkyl phthalates, especially C9- to C13-dialkyl phthalates, and C4- to C10-dialkyl esters of 1,2-, 1,3- or 1,4-cyclohexanedicarboxylic acid.

8. Plasticizer composition according to any of the preceding embodiments, which in addition to the at least one compound according to the aforementioned formula (I) or the mixture of compounds according to the aforementioned formula (I), comprises 1,2- or 1,4-cyclohexanedicarboxylic esters, in particular the corresponding diisononyl or di-2-ethylhexyl esters.

9. Plasticizer composition according to embodiments 1 to 7, which in addition to the at least one compound according to the aforementioned formula (I) or the mixture of compounds according to the aforementioned formula (I), comprises di-ethylhexyl terephthalate (DOTP).

10. Plasticizer composition according to embodiments 1 to 7, which in addition to the at least one compound according to the aforementioned formula (I) or the mixture of compounds according to the aforementioned formula (I), comprises a fast-gelling plasticizer selected from the group consisting of dibutyl terephthalate, di(iso)pentyl terephthalate, isodecyl benzoate, isononyl benzoate, acetyl tributyl citrate, tributyl citrate, dipropyleneglycol dibenzoate, diethyleneglycol dibenzoate, triethyleneglycol dibenzoate and mixtures of two or more thereof.

11. Use of the plasticizer composition according to any of the preceding embodiments as plasticizer for polymers.

12. Use according to embodiment 11 for PVC or vinyl chloride-containing polymers.

13. Plastic composition comprising one or more polymers selected from the group consisting of polyvinyl chloride, copolymers of vinyl chloride with vinyl acetate or with butyl acrylate, polyalkyl methacrylate (PAMA), polyvinyl butyral (PVB), polyurethane, polysulfides, polylactic acid (PLA), polyhydroxybutyral (PHB) and nitrocellulose, and the plasticizer composition according to any of embodiments 1 to 7.

14. Plastic composition according to embodiment 13, wherein the plastic composition comprises at least PVC as polymer.

DETAILED DESCRIPTION OF THE INVENTION

The present invention provides a plasticizer composition comprising at least one compound according to the following formula (I)

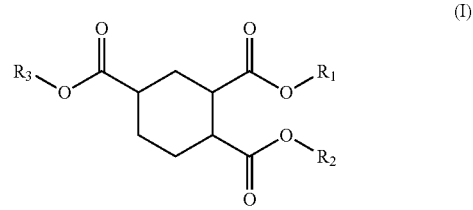

wherein the radicals $R_1$, $R_2$ and $R_1$ are each independently selected from the group consisting of n-pentyl, 2-methylbutyl and 3-methylbutyl. The radicals $R_1$, $R_2$ and $R_3$ are therefore independently one of three possible isomeric C5-alkyl radicals.

In a particularly preferred embodiment of the present invention, the radicals $R_1$, $R_2$ and $R_3$ are identical. This means that the radicals $R_1$, $R_2$ and $R_3$ all correspond to the same alkyl radical, i.e. either $R_1=R_2=R_3=$n-pentyl or $R_1=R_2=R_3=$2-methylbutyl or $R_1=R_2=R_3=$3-methylbutyl. The compounds resulting therefrom are the compounds (II), (III) and (IV) shown below. Compound (II) refers to the compound where $R_1=R_2=R_3=$n-pentyl, compound (III) refers to the compound where $R_1=R_2=R_3=$2-methylbutyl and compound (IV) refers to the compound where $R_1=R_2=R_3=$3-methylbutyl. In a preferred embodiment of the present invention, the plasticizer composition comprises at least one of the compounds (II), (III) or (IV).

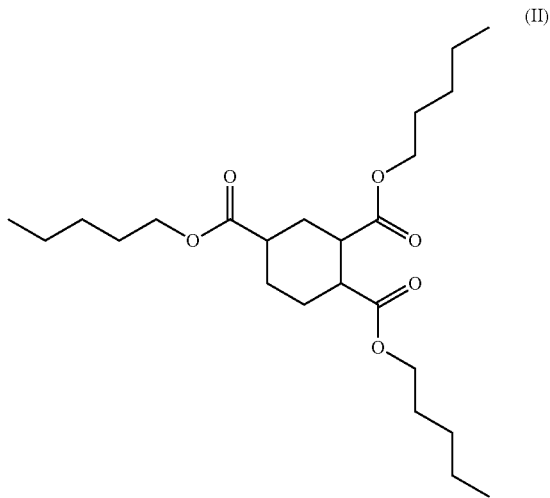 [SMILES: CCCCCOC(=O)C1CCC(C(=O)OCCCCC)C(C(=O)OCCCCC)C1]

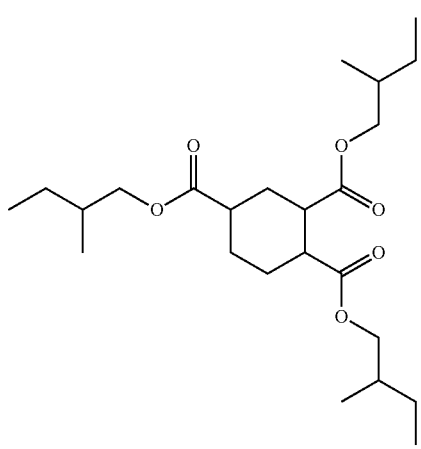

(III)

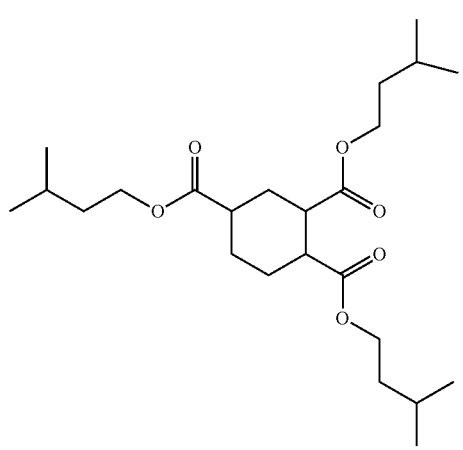

(IV)

Surprisingly, it has been found that the plasticizer composition according to the invention has improved properties, for example with respect to gelation characteristics, viscosity and Shore hardness. When using the plasticizer composition in plastisols and dryblends, improved processability compared to the non-ring hydrogenated trimellitates is surprisingly exhibited.

The plasticizer composition according to the invention also relates in particular to mixtures of compounds according to the aforementioned formula (I). In the case of mixtures of different compounds in which the radicals $R_1$, $R_2$ and $R_3$ may bear different isomeric alkyl radicals and/or in which a particular alkyl radical may also be present on one of the different positions $R_1$, $R_2$ and $R_3$, a multiplicity of different compounds according to the formula (I) may thus be present in the mixture. As a result of this, the mixtures are described below by means of their proportion of the respective alkyl radicals, which is based on all compounds according to the formula (I) present in the mixture. The proportions of the respective alkyl radicals may be determined by $^1$H-NMR. In the context of the present invention, it is understood that the radicals $R_1$, $R_2$ and $R_3$ can always have the same definition, i.e. are in each case independently selected from the group consisting of n-pentyl, 2-methylbutyl and 3-methylbutyl.

The plasticizer composition according to the invention thus preferably comprises a mixture of compounds according to the formula (I)

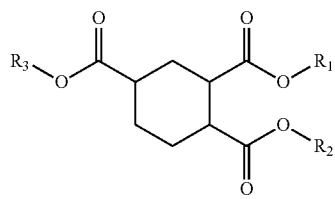

(I)

wherein present in the mixture are one alkyl radical from the group consisting or n-pentyl, 2-methylbutyl and 3-methylbutyl at a proportion of 30 to 95 mol % and one other alkyl radical or the two other alkyl radicals from the group specified at a proportion of 5 to 70 mol %, based in each case on all radicals $R_1$, $R_2$ and $R_3$ of all the compounds according to the formula (I). This means, for example, that present in the mixture are n-pentyl at a proportion of 30 to 95 mol % and 2-methylbutyl and/or 3-methylbutyl at a proportion of 5 to 70 mol %, based on all radicals $R_1$, $R_2$ and $R_3$ of the compounds of the formula (I).

On the basis of the aforementioned proportions of 30 to 95 mol % for one of the three specified alkyl radicals and 5 to 70 mol % for one of the two other alkyl radicals or the two other alkyl radicals, the following proportions for the respective possible alkyl radicals may for example result in the mixture of compounds according to the formula (I), based on all radicals $R_1$, $R_2$ and $R_3$:

| n-Pentyl/ mol % | 2-Methyl- butyl/mol % | 3-Methyl- butyl/mol % |
|---|---|---|
| 50 | 50 | — |
| 50 | — | 50 |
| 40 | 30 | 30 |
| 34 | 33 | 33 |
| 47 | 3 | 50 |
| 95 | 5 | 0 |

Particular preference for the purposes of the invention is given to a plasticizer composition comprising a mixture of compounds according to the aforementioned formula (I), wherein present in the mixture are one radical from the group consisting of n-pentyl, 2-methylbutyl and 3-methylbutyl at a proportion of 40 to 95 mol % and one other radical or the two other radicals from the group specified at a proportion of 5 to 60 mol %, based in each case on all radicals $R_1$, $R_2$ and $R_3$ of the compound according to the formula (I).

It is further preferred in accordance with the invention when the proportion of 2-methylbutyl radicals is restricted. An accordingly preferred plasticizer composition is a plasticizer composition comprising a mixture of compounds according to the aforementioned formula (I), wherein the 2-methylbutyl radical is present in the mixture at a proportion of at maximum 60 mol %, preferably at a proportion of at maximum 40 mol %, especially preferably at maximum 20 mol %, based in each case on all radicals $R_1$, $R_2$ and $R_3$ of the compound according to the formula (I).

The compounds according to the invention of the aforementioned formula (I) may be prepared by various methods. In principle, an esterification would be possible of 1,2,4-cyclohexanetricarboxylic acid with the corresponding alcohols n-pentanol, 2-methylbutanol and 3-methylbutanol to give the compounds of the formulae (I), (II), (III) and (IV). If mixtures of compounds according to the aforementioned formula (I) are to be prepared, these mixtures can be made by esterification of 1,2,4-cyclohexanetricarboxylic acid with an appropriate alcohol mixture composed of the relevant alcohols n-pentanol, 2-methylbutanol and 3-methylbutanol. The method conditions for esterification of cyclohexanepolycarboxylic acid derivatives are known in principle to those skilled in the art.

A further possible method for preparing the compounds of the aforementioned formula (I) is the transesterification of a triester of 1,2,4-cyclohexanetricarboxylic acid. In this case, a triester is preferably used, the respective alkyl radicals of which have a lower number of carbon atoms than the C5-alkyl radicals n-pentyl, 2-methylbutyl and 3-methylbutyl present here. An example of this would be the trimethyl ester of 1,2,4-cyclohexanetricarboxylic acid. To prepare the compounds according to the aforementioned formulae (II), (III) and (IV), the trimethylester of 1,2,4-cyclohexanetricarboxylic acid is then transesterified with the respective alcohol n-pentanol, 2-methylbutanol or 3-methylbutanol. To prepare a mixture of compounds according to the aforementioned formula (I), the trimethyl ester of 1,2,4-cyclohexanetricarboxylic acid may be transesterified with an appropriate alcohol mixture composed of the relevant alcohols n-pentanol, 2-methylbutanol and/or 3-methylbutanol. The method conditions for transesterification of cyclohexanepolycarboxylic ester derivatives are known in principle to those skilled in the art.

A further possible method for preparing compounds of the aforementioned formula (I) Is the ring-hydrogenation of corresponding esters of trimellitic acid. In this case, tripentyl esters of trimellitic acid are used as reactants, wherein each pentyl radical may be independently n-pentyl, 2-methylbutyl and 3-methylbutyl, which correspond to the compound according to the aforementioned formula (I) to be prepared. To prepare a mixture of compounds according to the aforementioned formula (I), an appropriate mixture of tripentyl esters of trimellitic acid is then used, based on the proportion of the respective alkyl radicals. The method conditions of a ring-hydrogenation are known in principle to those skilled in the art, for example, from EP 1 511 582 A1. The trimellitic esters can be previously prepared incidentally by esterification or transesterification of trimellitic acid or trimellitic anhydride or a trialkyl ester of trimelitic acid (see for example EP 3 147 318 A1).

The plasticizer composition according to the invention, in addition to the at least one compound according to the aforementioned formula (I) or the mixture of compounds according to the formula (I), may comprise a further plasticizer. Depending on the application purpose, one or more additional plasticizers, in particular different from the compounds according to the aforementioned formula (I), may be present in the plasticizer composition, in order to specifically adjust the properties of the resulting plasticizer composition. According to a particularly preferred embodiment, the plasticizer composition comprises however less than 5% by weight, more preferably less than 0.5% by weight, particularly preferably less than 0.1% by weight phthalates.

The additional plasticizer may in principle be selected from the group consisting of adipates, benzoates, for example monobenzoates or glycol dibenzoates, chlorinated hydrocarbons (so-called chloroparaffins), citrates, cyclohexanedicarboxylates, epoxidized fatty acid esters, epoxidized vegetable oils, epoxidized acylated glycerides, furandicarboxylates, phosphates, succinates, sulfonamides, sulfonates, terephthalates, trimellitates and oligomeric or polymeric esters based on adipic acid, succinic acid or sebacic acid. In a preferred embodiment of the present invention, the plasticizer composition comprises a further plasticizer selected from the group consisting of alkyl benzoates, alkylsulfonic acid esters of phenol, dialkyl adipates, glycerol esters, C4-C6-acids of polyols, trialkyl citrates, acetylated trialkyl citrates, glycol dibenzoates, trialkyl esters of trimellitic acid, dialkyl terephthalates, dialkyl phthalates, esters of furandicarboxylic acid, dialkanoyl esters of dianhydrohexitols (e.g. isosorbide), epoxidized fatty acid alkyl esters, polymer plasticizers, for example the polyadipates, and dialkyl esters of 1,2-, 1,3- or 1,4-cyclohexanedicarboxylic acid.

In a further preferred embodiment, the further plasticizer which is present in the plasticizer composition is selected from the group consisting of C8- to C13-alkyl benzoates, C4- to C10-dialkyl adipates, pentaerythritol tetravalerate, acetylated trialkyl citrates having C4 to C9-alkyl groups, C4- to C10-trialkyl trimellitates, C4- to C9-dialkyl terephthalates, C4- to C13-dialkyl phthalates, especially C9- to C13-dialkyl phthalates, and C4- to C10-dialkyl esters of 1,2-, 1,3- or 1,4-cyclohexanedicarboxylic acid.

The present invention preferably provides a
plasticizer composition which comprises the at least one compound according to the aforementioned formula (I) or a mixture of compounds according to the aforementioned formula (I) and di-ethylhexyl terephthalate (DEHT or DOTP). Corresponding plasticizer compositions are notable for low volatility. These plasticizer compositions are usable in a particularly advantageous manner for indoor applications, since products comprising corresponding plasticizer compositions have low emission values.

The present invention further preferably provides a plasticizer composition which comprises the at least one compound according to the aforementioned formula (I) or a mixture of compounds according to the aforementioned formula (I) and 1,2- or 1,4-cyclohexanedicarboxylic esters, in particular the corresponding diisononyl or di-2-ethylhexyl esters. Products comprising these plasticizer compositions are particularly characterized in that, in addition to low volatility, they additionally have improved cold flexibility. Moreover, plastisols comprising corresponding plasticizer compositions have better processability because of a lowered viscosity. At the same time, they exhibit very good UV stability, so that they may be used advantageously both indoors and outdoors.

Also preferred is a plasticizer composition comprising the at least one compound according to the aforementioned formula (I) or a mixture of compounds according to the aforementioned formula (I) and trialkyl esters of trimellitic acid, in which the alkyl radicals have 6 and more carbon atoms, preferably 7, 8, 9, 10 or 11 carbon atoms. Corresponding plasticizer compositions or the products produced therefrom have a particularly low volatility.

The present invention further preferably provides a plasticizer composition which comprises the at least one compound according to the aforementioned formula (I) or a mixture of compounds according to the aforementioned formula (I) and a fast-gelling plasticizer selected from the group consisting of dibutyl terephthalate, di(iso)pentyl terephthalate, isodecyl benzoate, isononyl benzoate, acetyl tributyl citrate, tributyl citrate, dipropyleneglycol dibenzoate, diethyleneglycol dibenzoate, triethyleneglycol dibenzoate and mixtures of two or more thereof. These fast-gelling plasticizers ensure improved processability in plastisol applications such as floor coverings, artificial leather or wall coverings.

The plasticizer compositions according to the invention comprising the compounds according to the aforementioned formula (I) or mixtures of compounds according to the aforementioned formula (I), with or without further plasticizer, may be used as plasticizer for plastics or polymers. The use as plasticizer for polymers is a further part of the subject-matter of the present invention.

Suitable polymers are preferably selected from the group formed by polyvinyl chloride (PVC), homo- or copolymers based on ethylene, propylene, butadiene, vinyl acetate, glycidyl acrylate, glycidyl methacrylate, ethyl acrylate, butyl acrylate or methacrylate having alkoxy radicals of branched or unbranched alcohols having one to ten carbon atom(s), acrylonitrile or cyclic olefins, chlorosulfonated polyethylene, polyvinylidene chloride (PVDC), polyacrylates, especially polymethyl methacrylate (PMMA), polyalkyl methacrylate (PAMA), polyureas, silylated polymers, fluoropolymers, especially polyvinylidene fluoride (PVDF), polytetrafluoroethylene (PTFE), polyvinyl acetate (PVAc), polyvinyl alcohol (PVA), polyvinyl acetals, especially polyvinyl butyral (PVB), polystyrene polymers, especially polystyrene (PS), expandable polystyrene (EPS), acrylonitrile styrene acrylate (ASA), styrene-acrylonitrile (SAN), acrylonitrile butadiene styrene (ABS), styrene-maleic anhydride copolymer (SMA), styrene-methacrylic acid copolymer, polyolefins, especially polyethylene (PE) or polypropylene (PP), thermoplastic polyolefins (TPO), polyethylene-vinyl acetate (EVA), polycarbonates, polyethylene terephthalate (PET), polybutylene terephthalate (PBT), polyoxymethylene (POM), polyamide (PA), polyurethane (PU), thermoplastic polyurethane (TPU), polysulfides (PSu), biopolymers, especially polylactic acid (PLA), polyhydroxybutyral (PHB), polyhydroxyvaleric acid (PHV), polyesters, starch, cellulose and cellulose derivatives, especially nitrocellulose (NC), ethylcellulose (EC), cellulose acetate (CA), cellulose-acetate/butyrate (CAB), rubber and silicones.

The plasticizer compositions according to the invention are preferably used as plasticizer for PVC or vinyl chloride-containing polymers.

The present invention further provides a plastic composition which comprises one or more polymers selected from the group consisting of polyvinyl chloride (PVC), copolymers of vinyl chloride with vinyl acetate or with butyl acrylate, polyalkyl methacrylate (PAMA), polyvinylbutyral (PVB), polyurethane, polysulfides, polylactic acid (PLA), polyhydroxybutyral (PHB) and nitrocellulose, and the plasticizer composition according to the invention comprising the compounds according to the aforementioned formula (I) or mixtures of compounds according to the aforementioned formula (I), with or without further plasticizers. The preferred polymer in the plastic composition is PVC. The PVC is preferably a suspension PVC, bulk PVC, microsuspension PVC or emulsion PVC. With regard to the proportions by mass of the individual components, it is preferred in accordance with the invention that the plastic composition comprises, per 100 parts by mass of polymer, from 5 to 200, preferably from 10 to 150 parts by mass, of the plasticizer composition according to the invention.

It may also be advantageous if the plastic compositions according to the invention comprise not only the one or more polymers and the plasticizer composition according to the invention but also one or more additives from the group of the heat stabilizers, filers, pigments, blowing agents, biocides, UV stabilizers, light stabilizers, costabilizers, antioxidants, viscosity regulators, deaerating agents, adhesion promoters, lubricants and colorants. The plastic compositions according to the invention preferably comprise heat stabilizers and optionally fillers and pigments.

The plastic compositions according to the invention can be used in adhesives, sealing compounds, coating materials, paints, inks, plastisols, foams, synthetic leather, floor coverings (e.g. top layer or foam layer), roofing membranes, underbody protection compounds, fabric coatings, cables, wire insulation, hoses, extruded articles, films, in the automotive interior sector, in wall coverings, liquid inks, toys, contact sheets, food packaging or medical articles, for example tubes or blood bags.

The present invention Is described hereinbelow with reference to examples. These examples are illustrative and are not to be understood as limiting.

Example 1: Preparation of the Plasticizers According to the Invention

Into a glass apparatus comprising a stirred flask equipped with stirrer, sampling port, dropping funnel and water trap with attached intensive cooler and thermometer, were filled 432 g of 1,2,4-cyclohexanetricarboxylic acid (2.0 mol; Suzhou Rovathin Foreign Trade Co. Ltd., purity (NMR)>99.9%) with initially 3.75 mol of C5-alcohol or C5-alcohol mixture. The apparatus was flushed with nitrogen (6 l/h) for at least one hour via the sampling port. 0.51 g of tetra-n-butyl titanate (0.0015 mol) were then added.

The reaction mixture was slowly heated to boiling temperature with stirring and continuous nitrogen flow (6 l/h). From this moment, water was produced which was continuously removed from the reaction via the water trap. After reaching a temperature of 240° C., a further 3.75 mol of the C5-alcohol or the C5-alcohol mixture and 0.51 g of tetra-n-butyl titanate (0.0015 mol) were metered in via the dropping funnel and the sampling port such that the reaction temperature did not fan below 240° C. In the course of the esterification, ca. 108 ml of water were produced (6 mol of water of reaction). After reaching this amount of water, the acid number was determined from time to time by means of a reaction sample. The reaction was terminated after reaching an acid number of less than 0.1 mg KOH per g of sample and the resulting crude product processed as described below.

The crude product was decanted into a stirred flask equipped with stirrer, thermometer, immersion dip tube. Claisen bridge and receiver flask. The apparatus was flushed with nitrogen (6 l/h) for at least one hour via the immersion dip tube. To the crude product were added 10 mol of water per mole of catalyst and 2% by weight activated carbon (based on the total amount of product) and the mixture was stirred at 80° C. under nitrogen for 15 minutes. The mixture was then heated slowly under maximum vacuum (<5 mbar) and the temperature was increased according to the onset of distillation up to 160° C. After distillation of the excess alcohol was complete, the crude product was stripped under vacuum and introduction of nitrogen (20 mbar) for 3 hours, in order to further reduce the alcohol content. The mixture was then cooled back to 80° C. and mixed with 2% by weight basic aluminium oxide (based on the total amount of product) and stirred for 1 hour. At this temperature the product was then filtered through a Büchner funnel with filter paper and precompacted filter cake of filter aid (D14 Perlite) into a suction bottle by means of reduced pressure. The filtrate was the desired product (see Table 1).
Raw materials used:

TABLE 1

Alcohols used and the products obtainable therefrom

| Sample | Alcohols used | Reaction time t in hours | Purity of the ester (GC in area %) | Dynamic viscosity at 20° C. in mPa * s |
|---|---|---|---|---|
| A | n-Pentanol/2-methylbutanol (1:1) | 9 | 99.3 | 69 |
| B | n-Pentanol | 9 | 99.1 | 46 |
| C | 2-Methylbutanol | 7.5 | 99.2 | 121 |
| D | 3-Methylbutanol | 8 | 99.2 | 76 |

3-Methylbutanol (3-Mb): Sigma Aldrich, >99% purity
2-Methylbutanol (2-Mb): Sigma Aldrich, >99% purity
n-Pentanol (n-Pe): Sigma Aldrich, >99% purity

Example 2: Production and Testing of Plastisols and Specimens Produced Therefrom From the plasticizers synthesized according to Example 1, PVC plastisols were produced, as used, for example, for the manufacture of topcoat films (filter-free layer) for floor coverings. The amounts in the plastisol formulations are each given in parts by mass (phr). The formulation is reported in Table 2.

TABLE 2

Mixing ratios of the plastisols produced

| | Example number | | | | |
|---|---|---|---|---|---|
| Substance | 1.1 | 1.2 | 1.3 | 1.4 | 1.5 |
| Vestolit B 7021 Ultra | 100 | 100 | 100 | 100 | 100 |
| Vestinol 9 | 50 | | | | |
| A | | 50 | | | |
| B | | | 50 | | |
| C | | | | 50 | |
| D | | | | | 50 |
| Drapex 39 | 3 | 3 | 3 | 3 | 3 |
| Reagens CLX/759/6PF | 2 | 2 | 2 | 2 | 2 | paste-forming PVC from Vestolit GmbH
diisononyl phthalate (DINP) from Evonik Operations GmbH
Drapex 39: epoxidized soybean oil (ESBO) from Galata Chemicals
Reagens CLX/759/6PF: thermal stabilizer based on Ca/Zn from Reagens Firstly the liquid constituents and then the pulverulent constituents were weighed into a mixing beaker and stirred with a spatula so that unwetted powder was no longer present. The mixing beaker was then clamped in a dissolver stirrer. After switching on the stirrer, the speed was slowly increased to about 2000 rpm (revolutions per minute). During that time, the plastisol was cautiously deaerated. As soon as the plastisol had reached a temperature of about 30° C., the speed was lowered to ca. 350 rpm. Henceforth, the plastisol was deaerated at that speed and a pressure below 20 mbar for 9 minutes. This ensured that there could be no premature partial gelation in the homogenizing of the plastisol.

The plastisols thus produced were examined for various properties. Table 3 presents the results.

Determination of the Plastisol Viscosity

The viscosity of the plastisols thus produced was measured with a Physica MCR 101 rheometer (from Anton Paar Germany GmbH) with the aid of the associated software, using the rotation mode and the CC27 measuring system. The measurement was conducted after the plastisols had been equilibrated at 25° C. for 24 hours since their production.

The measurement involved the following points:
preliminary shear at 100 $s^{-1}$ for a period of 60 seconds, during which no measurements were taken
downward shear rate ramp from 200 $s^{-1}$ to 0.1 $s^{-1}$. 30 measurement points were recorded, each with a measurement point duration of 10 seconds.

The measurements were conducted at room temperature. What was determined in each case was the viscosity obtained at a shear rate of 100 $s^{-1}$. The results of the viscosity measurements for the plastisols with the plasticizers or plasticizer mixtures specified in each case are listed in Table 3.

Gelation Characteristics

The gelation characteristics of the plastisols were examined in a Physica MCR 101 (from Anton Paar) in oscillation mode with a parallel plate analysis system (PP25) operated under shear stress control. An additional temperature control hood was connected to the system in order to achieve the best possible heat distribution. The following measurement parameters were established:
Mode: Temperature gradient (linear temperature ramp)
Start temperature: 25° C.
End temperature: 180° C.
Heating/cooling rate: 5 K/min
Oscillation frequency: 4-0.1 Hz ramp (logarithmic)
Cycle frequency omega:
Number of measurement points: 63
Measurement point duration: 0.5 min
Automatic gap adjustment
Constant measurement point duration
Gap width 0.5 mm Analysis Procedure:

The spatula was used to apply a few drops of the plastisol to be analysed to the lower plate of the analysis system. In so doing, it was ensured that, after the analysis system had been assembled, it was possible for some plastisol to exude uniformly out of the analysis system (not more than about 6 mm in any direction). The temperature control hood was subsequently positioned over the sample and the analysis was started. This involved determining what is called the complex viscosity of the plastisol as a function of temperature. Onset of the gelling process was recognized by a sudden sharp rise in the complex viscosity. The earlier the onset of this rise in viscosity, the better the gelation capacity of the system. The measurement curves obtained were used to determine, by interpolation, the temperatures for each plastisol at which a complex viscosity of 1000 Pa*s was measured. The results are listed in Table 3.

Determination or the Shore A Hardness of the Films

For the determination of the Shore hardnesses, the plastisols produced in Example 2 were poured into circular stainless steel casting moulds having a diameter of 42 mm (initial weight: 20 g). The pastes were then gelated in the moulds in an air circulation drying cabinet at 200° C. for 25 min, cooled and then removed, and conditioned in a climate-controlled room (25° C.) for at least 16 hours prior to the measurement. The thickness of the test specimens obtained was about 12 mm.

The hardness measurements were conducted in accordance with DIN 53 505 using a Shore A measuring instrument from Zwick-Roell: the measurement was read off after 3 seconds in each case. Measurements were conducted at three different sites on each test specimen, and the average was formed. The results are listed in Table 3.

TABLE 3

Results of the experiments conducted

| | Example number | | | | |
|---|---|---|---|---|---|
| Property | 1.1 | 1.2 | 1.3 | 1.4 | 1.5 |
| Viscosity 100 s$^{-1}$ after 24 h | 6.67 | 11.3 | 8.24 | 17.2 | 9.15 |
| Gelation (T in ° C. at 1000 Pa * s) | 82 | 75 | 73 | 77 | 80 |
| Shore A hardness | 80 | 75 | 74 | 78 | 80 |

From the available results it can be seen that the described compounds according to the aforementioned formula (I) or mixtures thereof, when used in a plastisol, exhibit results largely comparable to DINP with respect to the viscosity. In terms of the gelation temperature and the Shore hardness, even significantly better results were achieved in some cases. Compared to the corresponding trimellitates with the same alcohol composition, the viscosity in the plastisol is significantly lower and thus the plastisol is more processable.

Example 3—Production or Dryblends

The test specimens required for the examples which follow are produced by dry mixing (dryblend production), calendering (rolling) and pressing of the following formulations:

TABLE 4

Mixing ratios of the dryblends produced

| | Example number | | | | |
|---|---|---|---|---|---|
| Substance | 2.1 | 2.2 | 2.3 | 2.4 | 2.5 |
| Inovyn 271PC | 100 | 100 | 100 | 100 | 100 |
| Vestinol 9 | 67 | | | | |
| A | | 67 | | | |
| B | | | 67 | | |
| C | | | | 67 | |
| D | | | | | 67 |
| Drapex 39 | 3 | 3 | 3 | 3 | 3 |
| Mark BZ 965 | 2 | 2 | 2 | 2 | 2 |
| Mark CD41-0137 | 0.4 | 0.4 | 0.4 | 0.4 | 0.4 |

PVC homopolymer from Inovyn
thermal stabilizer based on Ba/Zn from Galata
calcium stearate from Galata With dry mixtures, which are referred to as dryblends, it is possible, for example, after thermoplastic processing (e.g. calendering or extrusion) to produce cable and wire insulation, hoses or floors and roofing membranes. The dryblends were produced in a Brabender planetary mixer.

The "Winmix" software was used to set the following parameters in the Brabender planetary mixer:
Speed program: active
Profile: speed 50 rpm; hold time: 9 min;
  rise time (of the speed): 1 min;
  speed 100 rpm; hold time: 20 min Temperature: 88° C.
Measurement range: 2 Nm
Damping: 3

A temperature of 90° C. was set on the thermostat, and a temperature of the mixing vessel in the Brabender was controlled via a hose connection. The temperature in the mixing vessel was 88° C. after a one-hour equilibration period. Once the planetary mixer had conducted an internal calibration, the sold constituents (PVC, stabilizer), which had been weighed out beforehand into a PE beaker, were fed via a solids funnel and the filling stub present in the Brabender mixing vessel. The program was started and the powder mixture was stirred and heated in the mixing vessel for 9 minutes, before the liquid constituents were added rapidly over one minute via a liquids funnel and the filling stub present. The mixture was stirred in the planetary mixer for a further 20 minutes. After the program had ended, the finished dry mixture (powder) was removed. The transmitted torque-time diagram was evaluated using the Brabender software. After addition of the liquid constituents, a distinct rise in the curve is evident. Only when the curve clearly falls back down is the plasticizer absorption complete. The time difference between these two points is the plasticizer absorption time (so-called dryblend time). This and the maximum torque is automatically evaluated by the program (see Table 5).

These dryblends were used to produce rolled sheets. The rolled sheets were produced on a Collin W150 AP calendar, which had an automatic sample reverser and the temperature was controlled by an additional oil thermostat. Control was effected by means of Collin software.

A five-stage program was used to produce the rolled sheet:

| Level | Designation | Temp. [° C.] | Duration [s] | Gap width [mm] | Speed [rpm] |
|---|---|---|---|---|---|
| 1 | Plastification of the dryblend | 165 | 60 | 0.2 | 5 |
| 2 | Increasing the gap size | 165 | 30 | 0.5 | 20 |
| 3 | Activation of the sample reverser | 165 | 170 | 0.5 | 20 |
| 4 | Rolled sheet optimization | 165 | 30 | 0.5 | 25 |
| 5 | Roiled sheet removal | 165 | 60 | 0.5 | 7 |

On attainment of the roll temperature, the roll gap was calibrated. To start the measurement, the roll gap was adjusted to 0.2 mm. 160 g of each dryblend were weighed in and introduced into the roll gap with the rollers stationary and the program started.

The pressed plaques were produced with a Collin laboratory press. The prefabricated rolled sheets (see above) were used to produce the pressed plaques. The lateral edges of the rolled sheets were removed with the aid of a cutting machine, then the rolled sheet was cut into pieces of about 14.5×14.5 cm in size. For pressed plaques of thickness 1 mm, 2 rolled sheet pieces in each case were placed one on top of the other into the stainless steel pressing frame of size 15×15 cm.

The following three-stage program was used to produce the pressed plaques:

| Level | Designation | Temp. [° C.] | Pressure [bar] | Duration [s] |
|---|---|---|---|---|
| 1 | Initial pressing | 170 | 5 | 60 |
| 2 | Pressing | 170 | 200 | 200 |
| 3 | Cooling | 40 | 200 | 200 |

The pressed plaques thus produced were subjected to various tests. Table 5 presents the results.

The Shore A hardness was determined as described in Example 2 but here pressed plaques of 6 mm thickness were produced as test specimens. For this purpose, 12 rolled sheet pieces in each case were placed into a stainless steel pressing frame of size 5×5 cm.

Glass Transition Temperature (Tg) of the Pressed Plaques

The glass transition temperature was determined by DMTA measurements in accordance with DIN 85583 using an MCR 302 rheometer from Anton Paar. Under constant dynamic mechanical conditions (1 Hz, deformation 0.3%), the viscoelastic properties of the films (1 mm thickness) were recorded as a function of temperature (temperature ramp from −100 to +50° C.) and the storage modulus, the loss modulus and the loss factor were determined. The maximum of the loss modulus is interpreted in this case as the glass transition temperature. The following table shows in each case the average value of a duplicate determination.

TABLE 5

Results of the experiments conducted

| Property | Example number | | | | |
|---|---|---|---|---|---|
| | 2.1 | 2.2 | 2.3 | 2.4 | 2.5 |
| Plasticizer absorption time in s | 5.4 | 4.3 | 3.7 | 4.9 | 5.2 |
| Tg in ° C. | −36 | −26 | −33 | −20 | −18 |
| Shore A hardness | 71 | 66 | 65 | 67 | 69 |

In the case of the dryblends produced and the test specimens produced therefrom, it turns out that better results could be achieved in al cases with the inventive compounds according to the aforementioned formula (I) or mixtures thereof. In particular, the plasticizer absorption time and Shore A hardness were distinctly improved compared to DINP; compared to the corresponding trimellitates with identical alcohol composition, the glass transition temperature is clearly lower.

The invention claimed is:

1. A plasticizer composition, comprising consisting of:
at least one compound according to the following formula (I)

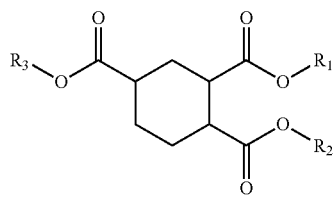

wherein the radicals $R_1$, $R_2$ and $R_3$ are each independently selected from the group consisting of n-pentyl, 2-methylbutyl, and 3-methylbutyl,
wherein the at least one compound according to the formula (I) consists of a mixture of compounds according to the formula (I),
wherein the mixture comprises one radical selected from the group consisting of n-pentyl, 2-methylbutyl, and 3-methylbutyl at a proportion of 30 to 95 mol %, and one other radical or two other radicals from the group specified at a proportion of 5 to 70 mol %, based in each case on a total amount of all radicals $R_1$, $R_2$ and $R_3$ of the at least one compound according to the formula (I), and
at least one further plasticizer selected from the group consisting of alkyl benzoates, dialkyl adipates, glycerol esters, trialkyl citrates, acylated trialkyl citrates, glycol dibenzoates, trialkyl esters of trimellitic acid, dialkyl terephthalates, dialkyl phthalates, esters of furandicarboxylic acid, dialkanoyl esters of dianhydrohexitols, epoxidized fatty acid alkyl esters, polymer plasticizers, and dialkyl esters of 1,2-, 1,3- or 1,4-cyclohexanedicarboxylic acid.

2. The plasticizer composition according to claim 1, wherein the mixture consists of one radical selected from the group consisting of n-pentyl, 2-methylbutyl, and 3-methylbutyl at a proportion of 40 to 95 mol %, and one other radical or two other radicals from the group specified at a proportion of 5 to 60 mol %, based in each case on the total amount of all radicals $R_1$, $R_2$ and $R_3$ of the at least one compound according to the formula (I).

3. The plasticizer composition according to claim 1, wherein the mixture consists of the 2-methylbutyl radical at a proportion of at maximum 60 mol %, based on the total amount of all radicals $R_1$, $R_2$ and $R_3$ of the at least one compound according to the formula (I).

4. The plasticizer composition according to claim 3, wherein the mixture consists of the 2-methylbutyl radical at a proportion of at maximum 40 mol %, based on the total amount of all radicals $R_1$, $R_2$ and $R_3$ of the at least one compound according to the formula (I).

5. The plasticizer composition according to claim 1, wherein the at least one further plasticizer is selected from the group consisting of $C_8$- to $C_{13}$-alkyl benzoates, $C_4$- to $C_{10}$-dialkyl adipates, trialkyl citrates having $C_4$ to $C_9$-alkyl groups, $C_4$- to $C_{10}$-trialkyl trimellitates, $C_4$- to $C_9$-dialkyl terephthalates, $C_4$- to $C_{13}$-dialkyl phthalates, and $C_4$- to $C_{10}$-dialkyl esters of 1,2-, 1,3- or 1,4-cyclohexanedicarboxylic acid.

6. The plasticizer composition according to claim 1, wherein the at least one further plasticizer is at least one dialkyl esters of 1,2- or 1,4-cyclohexanedicarboxylic acid.

7. The plasticizer composition according to claim 6, wherein the at least one 1,2- or 1,4-cyclohexanedicarboxylic ester is a corresponding diisononyl or di-2-ethylhexyl ester.

8. The plasticizer composition according to claim 1, wherein said at least one further plasticizer is a dialkyl terephthalate which is di-ethylhexyl terephthalate.

9. The plasticizer composition according to claim 1, wherein said further plasticizer is selected from the group consisting of dibutyl terephthalate, di(iso)pentyl terephthalate, isodecyl benzoate, isononyl benzoate, acetyl tributyl citrate, tributyl citrate, dipropyleneglycol dibenzoate, diethyleneglycol dibenzoate, triethyleneglycol dibenzoate, and mixtures of two or more thereof.

10. A method of plasticizing, comprising:

mixing a polymer with the plasticizer composition according to claim 1.

11. The method according to claim 10, wherein the polymer is PVC or a vinyl chloride-containing polymer.

12. A plastic composition, comprising:

one or more polymers selected from the group consisting of polyvinyl chloride (PVC), copolymers of vinyl chloride with vinyl acetate or with butyl acrylate, polyalkyl methacrylate (PAMA), polyvinyl butyral (PVB), polyurethane, polysulfides, polylactic acid (PLA), polyhydroxybutyral (PHB), and nitrocellulose; and the plasticizer composition according to claim 1.

13. The plastic composition according to claim 12, wherein the one or more polymers comprises at least PVC.

14. The plasticizer composition according to claim 1, wherein the at least one further plasticizer is a dialkanoyl ester of a dianhydrohexitol which is a dialkanoyl ester of isosorbide.

15. The plasticizer composition according to claim 1, wherein the at least one further plasticizer is a polymer plasticizer which is a polyadipate.

16. The plasticizer composition according to claim 1, wherein the at least one further plasticizer is a dialkyl phthalate which is a $C_9$- to $C_{13}$-dialkyl phthalate.

17. A plasticizer composition comprising least one compound according to the following formula (I)

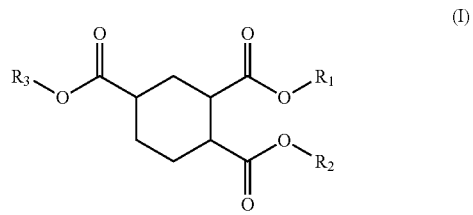

wherein the radicals $R_1$, $R_2$ and $R_3$ are each independently selected from the group consisting of n-pentyl, 2-methylbutyl and 3-methylbutyl, wherein the at least one compound according to the formula (I) comprises a mixture of compounds according to the formula (I), wherein the mixture comprises one radical selected from the group consisting of n-pentyl, 2-methylbutyl and 3-methylbutyl at a proportion of 30 to 95 mol % and one other radical or the two other radicals from the group specified at a proportion of 5 to 70 mol %, based in each case on a total amount of all radicals $R_1$, $R_2$ and $R_3$ of the at least one compound according to the formula (I), and wherein the 2-methylbutyl radical is present in the mixture at a proportion of at maximum 60 mol % based in each case on all radicals $R_1$, $R_2$ and $R_3$ of the compound according to the formula (I).

* * * * *